(12) United States Patent
Chanclou

(10) Patent No.: US 9,537,568 B2
(45) Date of Patent: Jan. 3, 2017

(54) METHOD FOR PROTECTING A PON FROM PHOTORECEIVER OVERLOAD BY AN ONT

(75) Inventor: Philippe Chanclou, Lannion (FR)

(73) Assignee: ORANGE, Paris (FR)

( * ) Notice: Subject to any disclaimer, the term of this patent is extended or adjusted under 35 U.S.C. 154(b) by 0 days.

(21) Appl. No.: 14/342,885

(22) PCT Filed: Sep. 4, 2012

(86) PCT No.: PCT/FR2012/051975
§ 371 (c)(1),
(2), (4) Date: Mar. 5, 2014

(87) PCT Pub. No.: WO2013/034844
PCT Pub. Date: Mar. 14, 2013

(65) Prior Publication Data
US 2014/0219648 A1    Aug. 7, 2014

(30) Foreign Application Priority Data
Sep. 5, 2011    (FR) ..................... 11 57831

(51) Int. Cl.
*H04B 10/00*    (2013.01)
*H04B 10/032*    (2013.01)
*H04Q 11/00*    (2006.01)
*H04J 3/06*    (2006.01)

(52) U.S. Cl.
CPC ........ *H04B 10/032* (2013.01); *H04Q 11/0067* (2013.01); *H04J 3/0652* (2013.01); *H04Q 2011/0081* (2013.01); *H04Q 2011/0083* (2013.01)

(58) Field of Classification Search
USPC .............................................. 398/66–73, 1–9
See application file for complete search history.

(56) References Cited

U.S. PATENT DOCUMENTS 6,108,112 A *  8/2000  Touma ................... H04B 10/07
                                                         398/1
7,187,861 B2 *  3/2007  Ruchet ................ H04B 10/079
                                                       356/73.1
(Continued)

FOREIGN PATENT DOCUMENTS

CN          101651492 A       2/2010

OTHER PUBLICATIONS

International Search Report and Written Opinion dated Nov. 15, 2012 for corresponding International Application No. PCT/FR2012/051975, filed Sep. 4, 2012.
(Continued)

*Primary Examiner* — Agustin Bello
(74) *Attorney, Agent, or Firm* — David D. Brush; Westman, Champlin & Koehler, P.A.

(57) ABSTRACT

A method and device are provided for protecting a passive optical network including an optical-line terminal connected to a plurality of optical network terminals grouped set-wise. The method includes: obtaining a transmission schedule of the optical network terminals; comparing, by set, the schedule with the signals transmitted by the optical network terminals, and, if at least one optical network terminal of an assembly does not transmit in synchronization with the schedule, disconnecting the assembly.

9 Claims, 5 Drawing Sheets

(56) References Cited

U.S. PATENT DOCUMENTS

| | | | | |
|---|---|---|---|---|
| 7,468,958 B2 * | 12/2008 | Emery | | H04B 10/077 370/241 |
| 7,778,543 B2 * | 8/2010 | Ferguson | | H04J 3/14 398/10 |
| 7,831,145 B2 * | 11/2010 | Gao | | H04J 3/14 370/352 |
| 7,881,607 B2 * | 2/2011 | DeLew | | H04B 10/0799 398/17 |
| 8,064,764 B2 * | 11/2011 | O'Byrne | | H04B 10/0793 398/15 |
| 8,249,446 B2 * | 8/2012 | Smith | | H04B 10/272 398/17 |
| 8,559,816 B2 * | 10/2013 | Zheng | | H04B 10/2504 398/17 |
| 8,582,969 B1 * | 11/2013 | Sandstrom | | H04B 10/272 398/17 |
| 8,824,894 B2 * | 9/2014 | Niibe | | H04J 3/1694 398/67 |
| 2006/0093356 A1 * | 5/2006 | Vereen | | H04L 12/2602 398/33 |
| 2007/0242954 A1 * | 10/2007 | Sackman | | H04B 10/0793 398/71 |
| 2008/0138064 A1 * | 6/2008 | O'Byrne | | H04B 10/0793 398/25 |
| 2009/0016713 A1 * | 1/2009 | Liu | | H04L 12/2697 398/17 |
| 2009/0060496 A1 * | 3/2009 | Liu | | H04J 3/0682 398/17 |
| 2009/0208210 A1 * | 8/2009 | Trojer | | H04J 3/1617 398/58 |
| 2009/0214222 A1 * | 8/2009 | Grossman | | H04B 10/032 398/173 |
| 2010/0150546 A1 * | 6/2010 | Shrikhande | | H04J 3/14 398/10 |
| 2011/0076013 A1 * | 3/2011 | Valvo | | H04B 10/07 398/30 |
| 2011/0087925 A1 * | 4/2011 | Haran | | H04B 10/077 714/37 |
| 2011/0129214 A1 * | 6/2011 | Zheng | | H04B 10/2504 398/27 |
| 2014/0029947 A1 * | 1/2014 | Wan | | H04B 10/272 398/67 |
| 2014/0219648 A1 * | 8/2014 | Chanclou | | H04Q 11/0067 398/1 |
| 2014/0294385 A1 * | 10/2014 | Khotimsk | | H04Q 11/0067 398/58 |
| 2015/0207585 A1 * | 7/2015 | Luo | | H04J 14/0256 398/72 |

OTHER PUBLICATIONS

English translation of the Written Opinion dated Nov. 15, 2012 for corresponding International Application No. PCT/FR2012/051975, filed Sep. 4, 2012.

French Search Report and Written Opinion dated May 2, 2012 for corresponding French Application No. 1157831, filed Sep. 5, 2011.

* cited by examiner

METHOD FOR PROTECTING A PON FROM PHOTORECEIVER OVERLOAD BY AN ONT

1. CROSS-REFERENCE TO RELATED APPLICATIONS

This application is a Section 371 National Stage application of International Application No. PCT/FR2012/051975, filed Sep. 4, 2012, which is incorporated by reference in its entirety and published as WO 2013/034844 on Mar. 14, 2013, not in English.

2. FIELD OF THE INVENTION

The field of the invention is that of access networks servicing subscribers to electronic communications services, and more particularly that of passive optical networks implementing reach extension modules.

3. PRIOR ART

In a passive optical network (PON) several optical network terminals (ONTs) are connected to one and the same optical line terminal (OLT) with which they exchange data by pooling one and the same optical wave frequency and one and the same optical fiber. Malfunctions may arise in diverse components of the PON, including in the ONTs. Access to the ONTs is particularly difficult because of the fact that they are equipment situated at the premises of the end users of electronic communications services, these users being clients of the operator managing the PON or clients of other operators with which the PON is shared. For malfunctions situated at the client's premises it is particularly beneficial for an operator to be able to employ a remote diagnosis and repair procedure, not requiring a technician to travel to the client's premises.

It is known to remotely diagnose a malfunction of an ONT by a method described in patent application US 2009/0060496 A1. The method implemented in an OLT consists in comparing the timeslot of sending of each ONT with an authorized send schedule so as to identify whether the ONT is indeed sending inside the slot allotted to it.

When an ONT sends outside of its send slot, it sends in one or more other slots allotted to one or more other ONTs. The effect of this is to corrupt the optical signal which the OLT will no longer be able to decode correctly. This phenomenon is commonly designated by the expression "photo receiver overload" of the OLT, or overload. The greater the extent of this off-slot sending, the greater the corruption of the signal, until it renders it totally undecodable by the OLT if the sending of the failed ONT is effected for example continuously over the whole of the band of the send schedule. The latter extreme case is observable for example if an ONT envisaged for a so-called "point-to-point" optical system (with a single ONT per OLT) is connected mistakenly or maliciously to a PON which is a so-called "point-to-multipoint" system.

When such a malfunction is diagnosed at the level of the OLT, the overloaded OLT can no longer correctly process the signals transmitted by the ONTs. The drawback is that all the "branches of the tree" PON situated between the OLT and the ONT "leaves" are impacted.

It is also known from the OMCI (ONT Management and Control Interface) protocol, from ITU-T standard G.988, that an OLT can dispatch a switch-off command to an ONT, this being particularly useful when the OLT has identified a malfunctioning ONT.

The drawback of this switch-off mechanism is that it is not guaranteed that the ONT identified as malfunctioning is in a position to correctly interpret the messages originating from the OLT, and in particular that it is in a position to execute the switch-off command. For example if the cause of the malfunction is the linking up of an ONT that is incompatible with the OLT, for example an ONT managed by a different operator from the one managing the OLT, the command of the OLT may be ignored by the ONT, and the malfunction impacting the whole of the PON tree continues indefinitely as long as a physical intervention is not undertaken at the client's premises.

A need therefore exists for a solution not exhibiting these drawbacks.

4. SUMMARY

The invention improves the situation with the aid of a method of protection of a passive optical network consisting of an optical line terminal connected to a plurality of optical network terminals grouped set-wise, characterized in that it comprises the following steps:

obtaining of a send schedule for the optical network terminals, comparison, set-wise, of the schedule with the signals sent by the optical network terminals, if at least one optical network terminal of a set does not send in synchronization with the schedule, disconnection of this set.

As each set corresponds to a branch of the PON tree, by performing the comparison at the level of a set it is possible to identify the branch containing the malfunctioning ONT and to isolate this branch from the remainder of the tree. In this manner only the ONTs of a single one of the branches of the PON tree are impacted by the malfunction. This is contrary to the prior art where the comparison is performed at the root of the tree, and where the consequence of a break is to impact all the branches of the PON tree.

According to one aspect of the invention, the method of protection is characterized in that the step of disconnecting a set is followed by the following step:

sending of a first management cue relating to the disconnection of the set, comprising the identifier of the set and a request for cessation of sending of all the optical network terminals of the set.

The advantage of this aspect of the invention is to be able to attempt fast resolution of the malfunction in the case where the ONT is capable of correctly interpreting a disconnection command. The first management cue contains at least one identifier of the set concerned, and a code allowing the OLT to recognize the type of the request.

In an advantageous variant, the first management cue relating to the disconnection of the set furthermore comprises the identifiers of the optical network terminals of the set, in the case where the connection topology of the ONTs is not known to the OLT.

According to one aspect of the invention, the method of protection is characterized in that the step of sending a first management cue is followed by the following steps:

verification of the cessation of sending of the optical network terminals of the set, reconnection of the set if cessation of sending is verified.

The advantage of this aspect of the invention is to be able to determine whether the malfunctioning ONT has correctly interpreted the disconnection command. If such is the case, the reconnection of the set prepares the restoral of normal service for all the ONTs of the PON branch corresponding to this set.

According to one aspect of the invention, the method of protection is characterized in that the step of reconnecting a set is followed by the following step:

sending of a second management cue relating to the reconnection of the set, comprising the identifier of the set and a request for resynchronization of all the optical network terminals of the set.

The advantage of this aspect of the invention is to signal that the restoral of normal service is possible. The second management cue contains at least one identifier of the set concerned, and a code allowing the OLT to recognize the type of the request.

In an advantageous variant, the second management cue relating to the reconnection of the set furthermore comprises the identifiers of the optical network terminals of the set, in the case where the connection topology of the ONTs is not known to the OLT.

The invention also relates to a method of management of a passive optical network consisting of an optical line terminal connected to a plurality of optical network terminals grouped set-wise, characterized in that it comprises the following step:

obtaining of a management cue relating to the disconnection or to the reconnection of a set of optical line terminals, subsequent to a comparison of a send schedule with the signals sent by these terminals.

The method of management is implemented in the OLT, which determines the send schedule. The sending of the send schedule to one or more other entities makes it possible to offload elsewhere than at the level of the OLT the comparison with the signals actually sent by the ONTs. These entities are for example optical line reach extension boxes, or EBs (Extender Boxes), comprising a port on the OLT side and several ports on the ONTs side. An EB is situated at a branch-off of the PON tree, therefore at an intermediate point between the OLT situated at the root and the ONTs situated at the leaves of the tree. The location of the EBs makes it possible to diagnose the malfunctions nearer their source and to more easily protect the malfunction-free branches.

To each port there corresponds a set of optical network terminals. A simple way of disconnecting and of reconnecting a set is therefore to close and to reopen a port.

The OLT receives the signals from the ONTs and is able to observe the variations in their behavior, such as signal disappearances or appearances. These variations may be induced either by an ONT malfunction, or by an action of an EB, such as the closing or the reopening of a port. It is important that the OLT can distinguish so as to perform better diagnosis and this is why the OLT must be informed when an EB closes or reopens a port, that is to say when it disconnects or reconnects a set.

According to one aspect of the invention, the method of management is characterized in that the step of obtaining a management cue is followed by the following steps:

sending of a command for cessation of sending of all the optical network terminals of the set, if the management cue relates to a disconnection, sending of a command for resynchronization of all the optical network terminals of the set, if the management cue relates to a reconnection.

As a function of the management cue received, the OLT sends an appropriate command to the ONTs concerned the result of which will be either to cause a malfunction to cease, or to restore normal service subsequent to a malfunction.

The invention also relates to a device for protection of a passive optical network consisting of an optical line terminal connected to a plurality of optical network terminals grouped set-wise, characterized in that it comprises:

means for obtaining a send schedule for the optical network terminals, means for comparing, set-wise, the schedule with the signals sent by the optical network terminals, disconnection means able to disconnect a set of optical network terminals when at least one optical network terminal of this set does not send in synchronization with the schedule.

The invention also relates to a device for management of a passive optical network consisting of an optical line terminal connected to a plurality of optical network terminals grouped set-wise, characterized in that it comprises means for obtaining a management cue relating to the disconnection or to the reconnection of a set of optical line terminals, subsequent to a comparison of a send schedule with the signals sent by these terminals.

The invention also relates to an extender box for a passive optical network, situated between an optical line terminal and a plurality of optical network terminals, characterized in that it comprises a device for protection of a passive optical network.

The invention also relates to an optical line terminal of a passive optical network, connected to a plurality of optical network terminals, characterized in that it comprises at least one device for management of a passive optical network.

According to one aspect of the invention, the optical line terminal is characterized in that it furthermore comprises a device for protection of a passive optical network.

This aspect makes it possible to also protect the branches of the PON tree which do not comprise any extender box between the OLT and the ONTs.

The invention also relates to a system for protection of a passive optical network consisting of an optical line terminal connected to a plurality of optical network terminals, said system characterized in that it comprises at least one device for protection of a passive optical network, and at least one device for management of a passive optical network.

The invention also relates to a computer program characterized in that it comprises instructions for the implementation of a method of protection of a passive optical network, when this program is executed by a processor.

The invention also relates to a computer program characterized in that it comprises instructions for the implementation of a method of management of a passive optical network, when this program is executed by a processor.

These programs, stored on a computer-readable medium, can use any programming language, and be in the form of source code, object code, or of code intermediate between source code and object code, such as in a partially compiled form, or in any other desirable form.

5. BRIEF DESCRIPTION OF THE FIGURES

Other advantages and characteristics of the invention will be more clearly apparent on reading the following description of a particular embodiment of the invention, given by way of simple illustrative and non-limiting example, and the appended drawings, among which.

6. DETAILED DESCRIPTION OF AT LEAST ONE EMBODIMENT OF THE INVENTION

In the subsequent description, the case is considered of an embodiment of the invention by opto-electronic elements, that is to say which convert the optical signal into an electrical signal and vice versa, but other embodiments apply to the invention, such as for example an embodiment by entirely optical elements.

Figure 1:
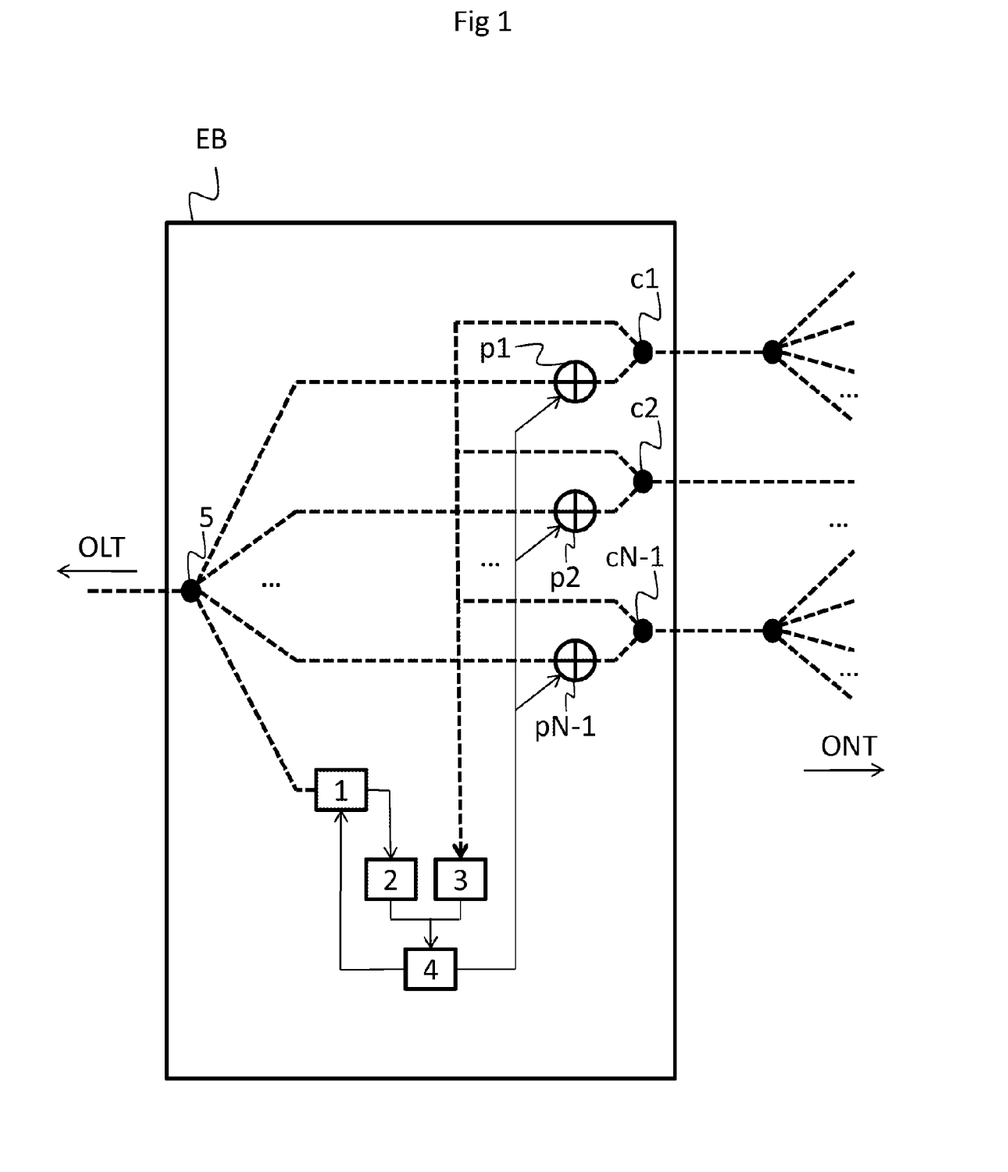
FIG. 1 presents the functional architecture of a protection device according to the invention, such as implemented in an extender box for a passive optical network.

The functional architecture of a protection device according to the invention, such as implemented in an extender box for a passive optical network PON, according to a particular embodiment of the invention, is now presented, with reference to FIG. 1.

In this example the device is housed in an extender box EB situated at a 1 to N branch-off point of a passive optical network PON. The branch-off is demarcated by a coupler 5 connected on one side to an optical line terminal OLT, and on the other side to optical network terminals ONTs, the number of which, potentially greater than N−1, is dependent on the number and the type of additional couplers 5 situated between EB and the ONTs.

On the OLT side, EB comprises a sender-receiver, or transceiver 1 (for "TRANSmitter-reCEIVER") making it possible to exchange with the OLT an optical signal dedicated to EB. It is through this optical signal that EB receives the send schedule for the ONTs, which is tapped off by a receiver 2.

On the ONT side, EB comprises N−1 ports p1, p2, . . . pN−1 servicing the sets of ONTs. To each port is connected a tapping-off coupler ci (i=1, 2 . . . N−1) making it possible to tap off the upstream signal sent by the ONTs. The envelope detector 3 detects the electrical envelope of the upstream signals.

The comparator 4 performs a port-by-port comparison of the electrical envelopes of the upstream signals with the schedule received from the OLT. For each of the ports whose upstream signal is not in conformity with the send schedule, the comparator 4 takes the decision to close the port in the upstream direction. The closure is performed at a point downstream of the tapping-off coupler with respect to the ONTs, for example at the level of the port pi so as to allow the envelope detector 3 to continue to observe all the upstream signals.

When the comparator 4 takes a closure decision, it informs the OLT thereof through a management cue in the signal dedicated to the EB, via the transceiver 1. This first management cue comprises the identifier of the port concerned, together with a request to cease sending for the ONTs concerned. In the case where the OLT does not know the topology of connection of the ONTs to the EB, this first management cue also contains the identifiers of each of the ONTs connected to the port concerned.

Conversely, if the comparator 4 notes that no signal reaches a closed port, it deduces therefrom that the ONTs concerned have indeed executed the command to cease sending requested during a previous phase. The comparator 4 then takes the decision to reopen the port. It informs the OLT thereof through a second management cue. This second management cue comprises the identifier of the port concerned, together with a request for synchronizing the ONTs concerned. In the case where the OLT does not know the topology of connection of the ONTs to the EB, this second management cue also contains the identifiers of each of the ONTs connected to the port concerned.

In a PON system, each send-receive cycle is represented by a frame, typically of 125 ms, whose total duration is distributed differently between the ONTs of the PON tree as a function of their respective needs in terms of upstream bitrate (that is to say when sending, from the ONTs to the OLT).

During each cycle and according to known principles, the OLT re-determines this distribution by dispatching to all the ONTs a send schedule to be complied with for the following cycle. In the prior art, the extender box EB does not have access to this schedule, and only the OLT is able to verify that the sends of the ONTs comply with the schedule. According to the invention, EB is considered by the OLT as one of the ONTs of the PON tree, thereby rendering a dedicated channel between OLT and EB irrelevant. EB therefore receives the schedule like each ONT.

Figure 2:
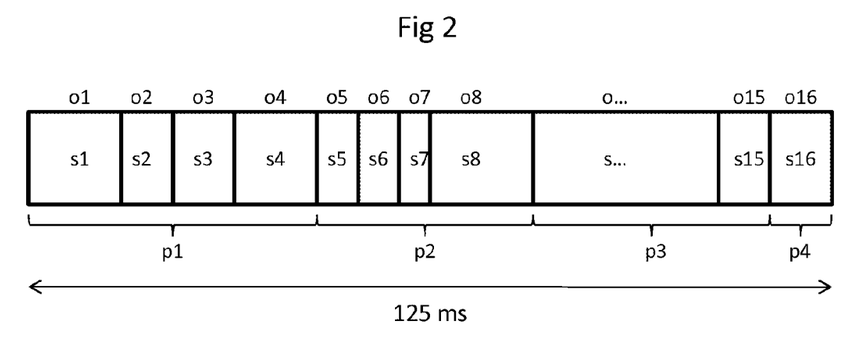
FIG. 2 presents by way of example a schedule for a send cycle intended for a PON system of 16 ONTs.

FIG. 2 presents by way of example a schedule for a send cycle intended for a PON system of 16 ONTs (o1 to o16) distributed into 4 sets each corresponding to a port of the EB (p1 to p4). It is seen that inside the frame of 125 ms the size of the send slots allocated by the OLT (s1 to s16) can vary greatly from one ONT to another. These slots can vary from one cycle to another. It is also seen that the number of ONTs is not necessarily the same from one port to another, but on the other hand it remains constant from one cycle to another.

Figure 3:
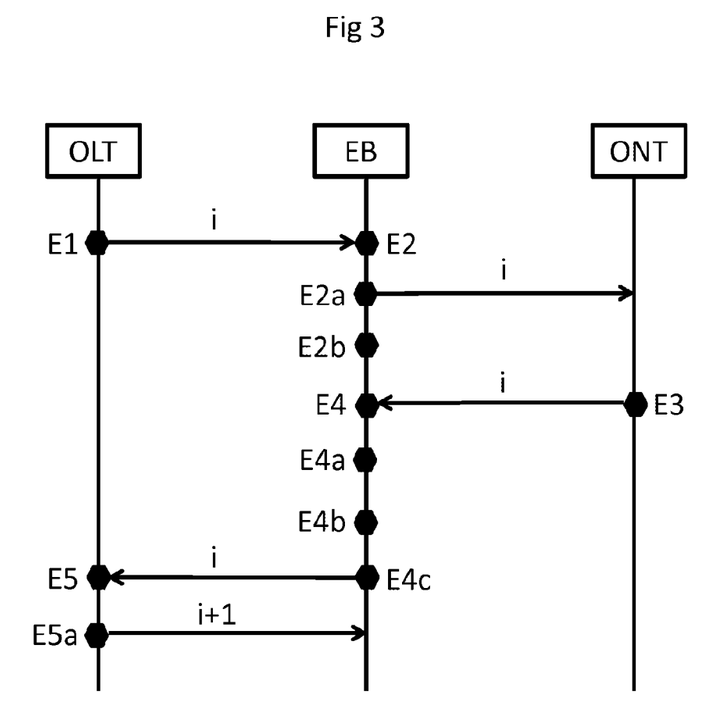
FIG. 3 presents the steps of the protection and management methods according to a particular embodiment of the invention, in which a set of ONTs is disconnected.
Figure 4:
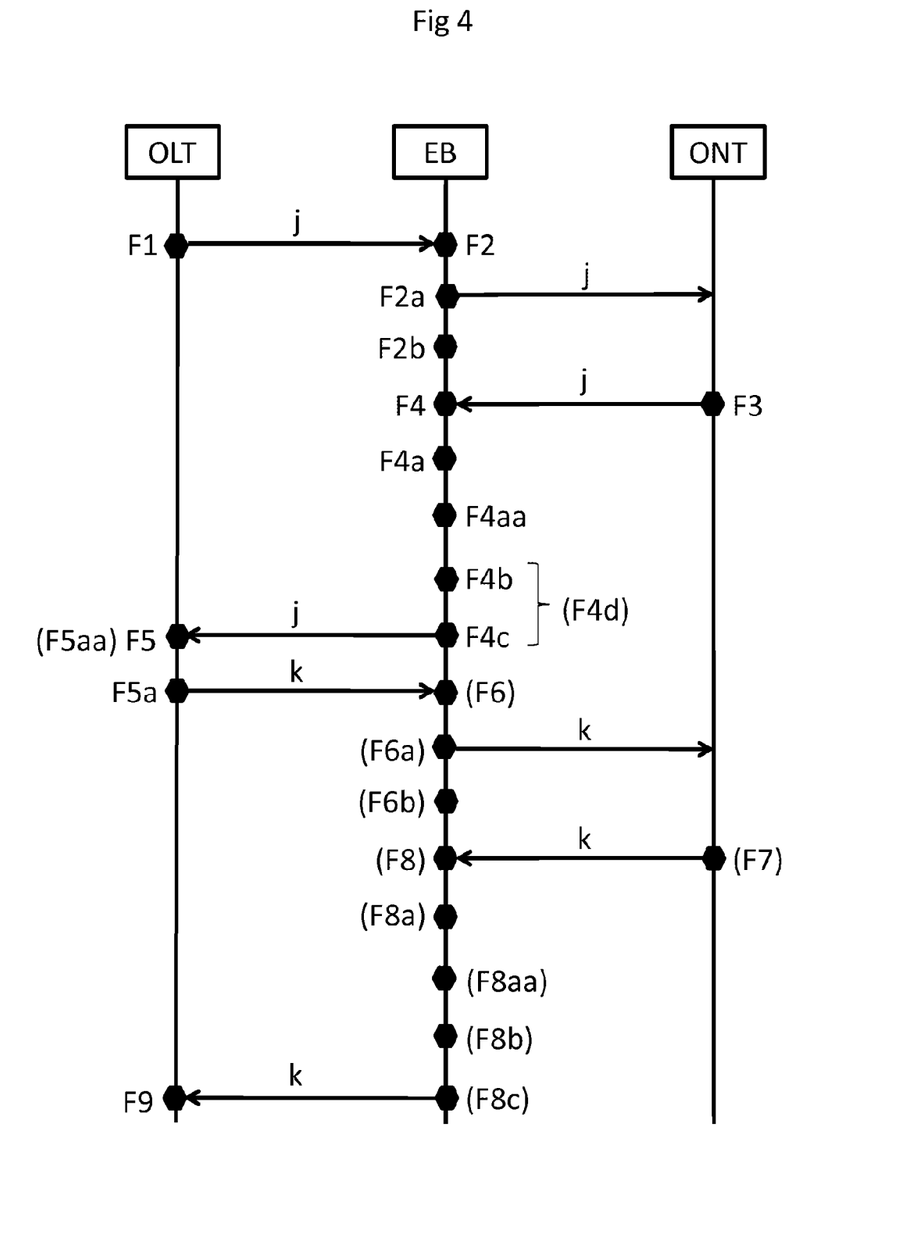
FIG. 4 presents the steps of the protection and management methods according to a particular embodiment of the invention, in which a set of ONTs is reconnected.

FIGS. 3 and 4 present the steps of the protection and management methods according to the invention, inside the send-receive cycles of a passive optical network PON.

FIG. 3 presents the steps of the protection and management methods according to a particular embodiment of the invention, in which a set of ONTs is disconnected. Stated otherwise, these steps describe the phase of closing a port of the EB.

During step E1, the OLT sends the downstream optical signal of cycle i to the ONTs. This signal contains inter alia the send schedule CAL i for cycle i, and is accessible to all the ONTs, including the EB.

During step E2, the EB receives the optical signal, transmits it to the ONTs during step E2a, and stores CAL i during step E2b.

During step E3, the ONTs send their respective upstream optical signal for cycle i to the OLT.

During step E4, the EB receives the optical signals. During step E4a, the EB performs port-by-port a comparison with CAL i of the send slots used by the ONTs. If an ONT sends outside of its slot, the corresponding port is closed during step E4b. For example, referring to FIG. 2, if the ONT o5 sends in the slots s4 and s5, rather than in the slot s5 alone as envisaged by the schedule, the port p2 is closed by the EB.

During step E4c, the optical signals of the ONTs are transmitted by the EB to the OLT, except the optical signals of the ONTs corresponding to the closed port (p2, in our example) which are not transmitted to the OLT onward of this cycle i. In this manner, the ONTs whose slot has been usurped during cycle i will no longer be impacted onward of cycle i+1 (the ONT o4 whose slot has been usurped by the ONT o5, in our example).

The signals transmitted to the OLT during step E4c also comprise the signal sent by the EB, which includes a management cue intended for the OLT. This management cue, received by the OLT during step E5, contains the identifier of the closed port, together with a request to cease sending for the ONTs corresponding to the closed port. In the case where the OLT does not know the topology of connection of the ONTs to the EB, this management cue also contains the identifiers of each of the ONTs connected to the port concerned.

During step E5a, the OLT sends, for cycle i+1, the downstream optical signal to the ONTs. This signal contains, inter alia, the send schedule CAL i+1 for cycle i+1, and, in the signal parts intended for the ONTs corresponding to the port closed during cycle i, a command to cease sending.

FIG. 4 presents the steps of the protection and management methods according to a particular embodiment of the invention, in which a set of ONTs is reconnected. Stated otherwise, these steps describe the phase of reopening of a port of the EB.

During step F1, the OLT sends the downstream optical signal of cycle j subsequent to cycle i to the ONTs, j being greater than or equal to i+1. This signal contains inter alia the send schedule CAL j for cycle j, and is accessible to all the ONTs, including the EB.

During step F2, the EB receives the optical signal, transmits it to the ONTs during step F2a, and stores CAL j during step F2b.

During step F3, the ONTs send their respective upstream optical signal for cycle j to the OLT.

During step F4, the EB receives the optical signals. During step F4a, the EB performs port-by-port a comparison with CAL j of the send slots used by the ONTs. During step F4aa, a check verifies whether all the ONTs corresponding to a port closed during cycle i have ceased sending. If such is the case, the corresponding port is reopened during step F4b. For example, referring to FIG. 2, if the ONTs o5 to o8 no longer send, that is to say if the slots s5 to s8 are empty, it may be assumed that the ONTs o5 to o8 have correctly executed a command to cease sending, and the port p2 is reopened by the EB.

Alternatively, if not all the ONTs corresponding to a port closed during cycle i have ceased sending, the corresponding port is not reopened, and step E4c of cycle i is returned to. Step E4c was described with reference to FIG. 3.

Otherwise, if the cessation to send is noted, during step F4c, the optical signals of the ONTs are transmitted by the EB to the OLT, including the optical signals of the ONTs corresponding to the port which has been reopened (p2, in our example).

The signals transmitted to the OLT during step F4c also comprise the signal sent by the EB, which includes a management cue intended for the OLT. This management cue, received by the OLT during step F5, contains the identifier of the reopened port, together with a synchronization request for the ONTs corresponding to the reopened port. In the case where the OLT does not know the topology of connection of the ONTs to the EB, this management cue also contains the identifiers of each of the ONTs connected to the port concerned.

During step F5a, the OLT sends, for cycle j+1, the downstream optical signal to the ONTs. This signal contains, inter alia, the send schedule CAL j+1 for cycle j+1, and, in the signal parts intended for the ONTs corresponding to the port reopened during cycle j, a synchronization command.

In an alternative embodiment, the closed port is not reopened during cycle j, that is to say immediately after the cessation of sending has been verified by the EB, but during a cycle k subsequent to cycle j, k being greater than or equal to j+1, that is to say after the EB has been able to verify that the ONTs corresponding to the closed port have indeed been correctly re-synchronized. Actually, the verification of the cessation to send may not be a sufficient condition for the service to return to normal, if for example the malfunctioning ONT combines the absence of sending in its slot, the presence of sending in at least one other, and the impossibility of correctly executing the command to cease sending. This is why it may also be necessary to have the EB verify that the malfunctioning ONT is indeed capable of executing the commands dispatched by the OLT.

In this alternative embodiment, steps F4b and F4c are replaced with a step F4d, and steps F6 to F9 are added. The steps of this alternative embodiment are between parentheses in FIG. 4.

During step F4d, the closed port is not reopened and the optical signals of the ONTs are transmitted by the EB to the OLT, except the optical signals of the ONTs corresponding to the still closed port (p2, in our example), which, since cycle i, have no longer been transmitted to the OLT.

The signals transmitted to the OLT during step F4d also comprise the signal sent by the EB, which includes a management cue intended for the OLT. This management cue, received by the OLT during step F5aa, contains the identifier of the closed port, together with a synchronization request for the ONTs corresponding to the closed port. In the case where the OLT does not know the topology of connection of the ONTs to the EB, this management cue also contains the identifiers of each of the ONTs connected to the port concerned.

Step F5a previously described follows step F5aa.

Steps F6, F6a, F6b, F7 and F8 are identical respectively to steps F2, F2a, F2b, F3 and F4, the only difference being the presence of a synchronization command destined for the ONT or ONTs concerned, instead of a command to cease sending.

During step F8a, the EB performs port-by-port a comparison between CAL k and the send slots used by the ONTs. During step F8aa, a check verifies whether all the ONTs corresponding to the port closed during cycle i send correctly in their slot such as envisaged in the CAL k. If such is the case, the corresponding port is reopened during step F8b. For example, referring to FIG. 2, if the ONTs o5 to o8 send in the slots s5 to s8, it may be assumed that the ONTs o5 to o8 have correctly executed a command to cease sending during cycle j, and then a synchronization command during cycle k, and the port p2 is reopened by the EB.

Alternatively, if on the contrary all the ONTs corresponding to a port closed during cycle i do not send correctly in their slot such as envisaged in CAL k, the corresponding port is not reopened, and step F4d is returned to.

Otherwise, if the resynchronization is noted, during step F8c, the optical signals of the ONTs are transmitted by the EB to the OLT, including the optical signals of the ONTs corresponding to the port which has been reopened (p2, in our example), and including a management cue intended for the OLT. This management cue, received by the OLT during step F9, contains the identifier of the reopened port. In the case where the OLT does not know the topology of connection of the ONTs to the EB, this management cue also contains the identifiers of each of the ONTs connected to the port concerned. The absence of a request to cease sending or of a resynchronization request in this management cue indicates that, from the point of view of the EB, the service has returned to normal. The management cue contains instead a request "null", or no request.

Figure 5:
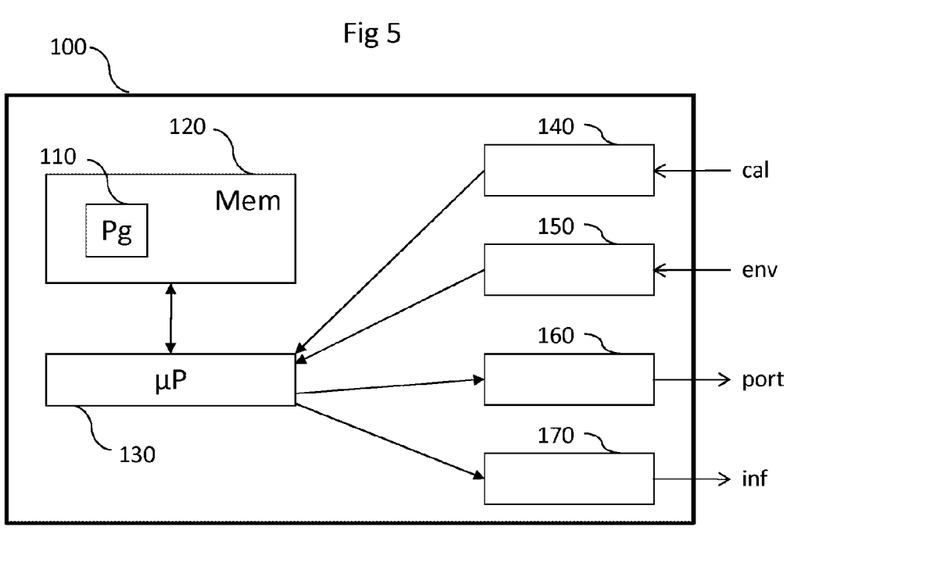
FIG. 5 presents the structure of an extender box EB implementing the method of protection, according to the invention.

In conjunction with FIG. 5, the structure of an extender box EB implementing the method of protection of a PON, according to the invention, is now presented.

According to one aspect of the invention, this extender box EB comprises a protection device 100. The protection device 100 according to the invention comprises:
- a schedule receiving module 140, able to receive a send schedule extracted from the downstream optical signal of the OLT,
- a module for receiving envelopes 150, able to receive the envelopes of the upstream optical signals of the ONTs,
- an interrupter module 160, able to interrupt and to restore the upstream traffic of a port of the EB,
- a request module 170, able to insert management cues into the optical signal destined for the OLT.

The schedule and the envelopes are processed by a processing unit 130 equipped with a microprocessor able to implement the constituent means, such as described previously, of the invention, in particular, means for port-by-port comparison of the schedule with the envelopes of the optical signals, those for deciding port closure and reopening, those for deciding sending of management cues.

The protection device 100 according to the invention furthermore comprises a memory 120 in which is stored a computer program 110 implementing the steps of the method of protection. Upon initialization, the code instructions of the computer program 110 are for example loaded into a RAM memory, before being executed by the processor of the processing unit 130.

Figure 6:
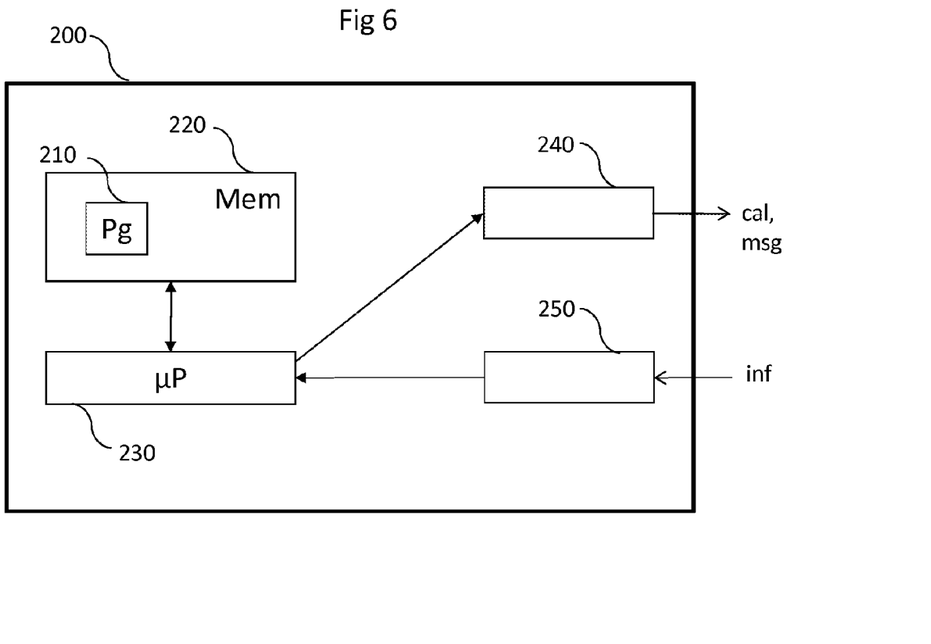
FIG. 6 presents the structure of an optical line terminal OLT implementing the method of management of a PON, according to the invention.

In conjunction with FIG. 6, the structure of an optical line terminal OLT, implementing the method of management of a PON according to the invention, is now presented.

According to one aspect of the invention, this optical line terminal OLT comprises a management device 200. The management device 200 according to the invention comprises:
- a sending module 240, able to send to the ONTs a schedule and management messages including commands to cease sending and synchronization commands,
- a receiving module 250, able to extract cues from the signal originating from the EB.

The requests are processed by a processing unit 230 equipped with a microprocessor able to implement the constituent means, such as described previously, of the invention, in particular, means for receiving and processing management cues originating from the EB.

The management device 200 according to the invention furthermore comprises a memory 220 in which is stored a computer program 210 implementing the steps of the method of management. Upon initialization, the code instructions of the computer program 210 are for example loaded into a RAM memory, before being executed by the processor of the processing unit 230.

Figure 7:
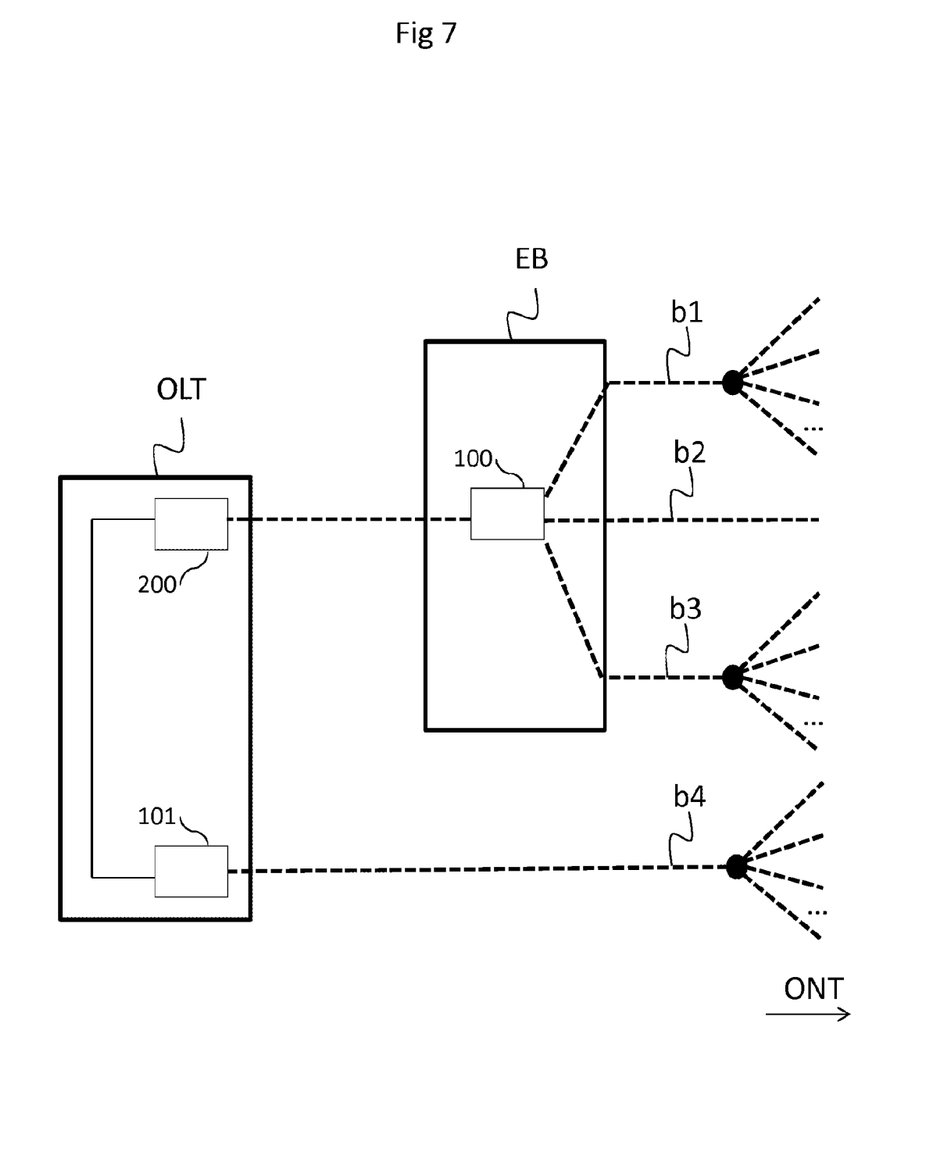
FIG. 7 presents, for a particular embodiment of the invention, the protection system, together with the structure of an optical line terminal OLT implementing at one and the same time the method of management and the method of protection of a PON.

In conjunction with FIG. 7, the protection system together with the structure of an optical line terminal OLT are now presented for a particular embodiment of the invention.

In this particular embodiment, in contradistinction to the branches b1, b2 and b3, the branch b4 of the PON tree does not comprise any extender box EB between the OLT and the ONTs. In order to protect this branch in the same manner as the others, the optical line terminal OLT also comprises a protection device 101 according to the invention, in addition to the management device 200 according to the invention. The exchanges of management cues according to the invention, between the device 200 and the device 101, are the same as described previously between the device 200 and the device 100.

The exemplary embodiments of the invention which have just been presented are merely a few of the conceivable embodiments. They show that the invention makes it possible to limit the impact of the malfunction of an ONT to some of the ONTs of a PON, while eliminating the malfunction remotely without requiring a technician to travel.

The invention claimed is:

1. A method of protection comprising:
   protecting a passive optical network including an optical line terminal connected to a plurality of optical network terminals grouped set-wise, and including a protection device between the optical line terminal and the plurality of optical network terminals, the protection device being connected to the optical line terminal by a coupler and to each set of optical network terminals by a respective port, wherein protecting comprises the following acts carried out by the protection device:
   obtaining a send schedule for the optical network terminals,
   comparison, by set, of the schedule with signals sent by the optical network terminals,
   if at least one optical network terminal of a set does not send in synchronization with the schedule, closing the port of this set, sending to the optical line terminal a first management cue relating to the closing of the port of the set, comprising an identifier of the set and a request for cessation of sending of all the optical network terminals of the set, and verifying remotely that the at least one optical network terminal not sending in synchronization with the schedule is capable of executing commands dispatched by the optical line terminal.

2. The method of protection as claimed in claim 1, wherein the first management cue relating to the closing of the port of the set furthermore comprises identifiers of the optical network terminals of the set.

3. The method of protection as claimed in claim 1, wherein the act of sending a first management cue is followed by the following acts:
   verification of the cessation of sending of the optical network terminals of the set,
   reopening of the port of the set if cessation of sending is verified.

4. The method of protection as claimed in claim 3, wherein the act of reopening the port of the set is followed by the following act:
   sending to the optical line terminal a second management cue relating to the reopening of the port of the set, comprising the identifier of the set and a request for resynchronization of all the optical network terminals of the set.

5. The method of protection as claimed in claim 4, wherein the second management cue relating to the reopening of the port of the set furthermore comprises the identifiers of the optical network terminals of the set.

6. A protection device for a passive optical network including an optical line terminal connected to a plurality of optical network terminals grouped set-wise, the protection device being situated between the optical line terminal and the plurality of optical network terminals, and being connected to the optical line terminal by a coupler and to each set of optical network terminals by a respective port, wherein the device comprises:
    means for obtaining a send schedule for the optical network terminals,
    means for comparing, set-wise, the schedule with signals sent by the optical network terminals,
    disconnection means for closing the port of a set of optical network terminals and sending to the optical line terminal a management cue relating to the closing of the port of the set, comprising an identifier of the set and a request for cessation of sending of all the optical network terminals of the set, when at least one optical network terminal of this set does not send in synchronization with the schedule, and
    means for verifying remotely that the at least one optical network terminal not sending in synchronization with the schedule is capable of executing commands dispatched by the optical line terminal.

7. An extender box for a passive optical network, situated between an optical line terminal and a plurality of optical network terminals, wherein the extender box comprises the protection device as claimed in claim 6.

8. A system for protection of a passive optical network including an optical line terminal connected to a plurality of optical network terminals grouped set-wise, wherein the system comprises:
    at least one protection device between the optical line terminal and the plurality of optical network terminals, the protection device being connected to the optical line terminal by a coupler and to each set of optical network terminals by a respective port, the protection device comprising:
    means for obtaining a send schedule for the optical network terminals,
    means for comparing, set-wise, the schedule with signals sent by the optical network terminals,
    disconnection means for closing the port of a set of optical network terminals and sending to the optical line terminal a management cue relating to the closing of the port of the set, comprising an identifier of the set and a request for cessation of sending of all the optical network terminals of the set, when at least one optical network terminal of this set does not send in synchronization with the schedule;
    means for verifying remotely that the at least one optical network terminal not sending in synchronization with the schedule is capable of executing commands dispatched by the optical line terminal; and
    at least one management device comprising:
    means for obtaining from the protection device the management cue;
    means for sending a command to cease sending, in response to the management cue, to the at least one optical network terminal not sending in synchronization with the schedule,
    wherein the protection device further comprises means for re-opening the port of the set if the means for verifying verifies the at least one optical network terminal not sending in synchronization with the schedule has executed the command to cease sending dispatched from by the optical line terminal.

9. A non-transitory computer-readable medium comprising a computer program stored thereon and comprising instructions for implementation of a method of protection when the program is executed by a processor, wherein the method comprises:
    protecting a passive optical network including an optical line terminal connected to a plurality of optical network terminals grouped set-wise, and including a protection device between the optical line terminal and the plurality of optical network terminals, the protection device being connected to the optical line terminal by a coupler and to each set of optical network terminals by a respective port, wherein protecting comprises the following acts performed by the protection device:
    obtaining a send schedule for the optical network terminals,
    comparison, by set, of the schedule with signals sent by the optical network terminals, and
    if at least one optical network terminal of a set does not send in synchronization with the schedule, closing the port of this set, sending to the optical line terminal a management cue relating to the closing of the port of the set, comprising an identifier of the set and a request for cessation of sending of all the optical network terminals of the set, and verifying remotely that the at least one optical network terminal not sending in synchronization with the schedule is capable of executing commands dispatched by the optical line terminal.

* * * * *